United States Patent
Wu et al.

(10) Patent No.: US 12,387,136 B2
(45) Date of Patent: Aug. 12, 2025

(54) METHOD AND APPARATUS FOR ADAPTING DEEP LEARNING MODEL, AND ELECTRONIC DEVICE

(71) Applicant: BEIJING BAIDU NETCOM SCIENCE AND TECHNOLOGY CO., LTD., Beijing (CN)

(72) Inventors: Tuobang Wu, Beijing (CN); En Shi, Beijing (CN); Yongkang Xie, Beijing (CN); Xiaoyu Chen, Beijing (CN); Lianghuo Zhang, Beijing (CN); Jie Liu, Beijing (CN); Binbin Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 969 days.

(21) Appl. No.: 17/604,670

(22) PCT Filed: Sep. 16, 2020

(86) PCT No.: PCT/CN2020/115660
§ 371 (c)(1),
(2) Date: Oct. 18, 2021

(87) PCT Pub. No.: WO2022/000802
PCT Pub. Date: Jan. 6, 2022

(65) Prior Publication Data
US 2022/0309395 A1    Sep. 29, 2022

(30) Foreign Application Priority Data

Jun. 29, 2020   (CN) .......................... 202010601781.5

(51) Int. Cl.
G06N 20/00    (2019.01)
G06F 16/242   (2019.01)
G06F 16/25    (2019.01)

(52) U.S. Cl.
CPC ........... *G06N 20/00* (2019.01); *G06F 16/242* (2019.01); *G06F 16/258* (2019.01)

(58) Field of Classification Search
CPC ...... G06N 20/00; G06F 16/242; G06F 16/258
See application file for complete search history.

(56) References Cited

U.S. PATENT DOCUMENTS

| | | |
|---|---|---|
| 2019/0370685 A1 | 12/2019 | Xie et al. |
| 2019/0391796 A1* | 12/2019 | Brady ................... G06F 8/458 |
| 2019/0392296 A1 | 12/2019 | Brady |

(Continued)

FOREIGN PATENT DOCUMENTS

| | | |
|---|---|---|
| CN | 106650922 A | 5/2017 |
| CN | 108764487 A | 11/2018 |

(Continued)

OTHER PUBLICATIONS

Scott Cyphers, etc., "Intel nGraph: An Intermediate Representation, Compiler, and Executor for Deep Learning", published via arXiv as of Jan. 30, 2018, retrieved Dec. 11, 2024. (Year: 2018).*

(Continued)

*Primary Examiner* — Shourjo Dasgupta
(74) *Attorney, Agent, or Firm* — Lippes Mathias LLP

(57) ABSTRACT

The present disclosure discloses a method and an apparatus for adapting a deep learning model, an electronic device and a medium, which relates to technology fields of artificial intelligence, deep learning, and cloud computing. The specific implementation plan is: obtaining model information of an original deep learning model and hardware information of a target hardware to be adapted; querying a conversion path table according to the model information and the (Continued)

--- determining a model before conversion and a model after conversion for each model conversion and an execution sequence of respective model conversions according to the conversion sequence of the plurality of intermediate deep learning models in the target conversion path — 201 generating a conversion task of each model conversion according to a mapping relation between the model before conversion and the model after conversion for each model conversion — 202 sequentially executing the conversion tasks of respective model conversions on the original deep learning model according to the execution sequence of respective model conversions, to obtain the target deep learning model — 203 hardware information to obtain a matched target conversion path; and converting, according to the target conversion path, the original deep learning model to an intermediate deep learning model in the conversion path, and converting the intermediate deep learning model to the target deep learning model. Therefore, the deep learning model conversion is performed based on the model conversion path determined by the model information of the original deep learning model and the hardware information of the target hardware, which realizes converting any type of original deep learning model into the target deep learning model adapted to any target hardware, and solves the problem that the deep learning model is difficult to be applied to different hardware terminals.

11 Claims, 2 Drawing Sheets

(56) References Cited

U.S. PATENT DOCUMENTS

| | | | |
|---|---|---|---|
| 2020/0104129 A1 | | 4/2020 | Liu et al. |
| 2020/0410354 A1* | | 12/2020 | Zejda ............... G06N 3/082 |

FOREIGN PATENT DOCUMENTS

| | | | | |
|---|---|---|---|---|
| CN | 109492241 | A | 3/2019 | |
| CN | 111191789 | A | 5/2020 | |
| CN | 111275199 | A | 6/2020 | |
| CN | 111291882 | A | 6/2020 | |
| JP | H0981569 | A | 3/1997 | |
| KR | 20200023238 | A | 3/2020 | |
| WO | WO-2020005806 A1 * | | 1/2020 | ............ G06F 8/65 |
| WO | 2020102888 | A1 | 5/2020 | |

OTHER PUBLICATIONS

Abhishek Dubey, "A quick intro to Intel's OpenVINO toolkit for faster deep learning inference", published on May 18, 2020 to https://towardsdatascience.com/a-quick-intro-to-intels-openvino-toolkit-for-faster-deep-learning-inference-d695c022c1ce, retrieved Dec. 11, 2024. (Year: 2020).*

Amit Dhurandhar, etc., "Improving Simple Models with Confidence Profiles", published as of Nov. 19, 2018 via arXiv, retrieved Dec. 11, 2024. (Year: 2018).*

Jared Roesch, etc., "Relay: A High-Level Compiler for Deep Learning", published to arXiv on Aug. 24, 2019, retrieved Jun. 25, 2025. (Year: 2019).*

Fred Chow, "Intermediate Representation—Communications of the ACM", published to https://cacm.acm.org/practice/intermediate-representation on Dec. 1, 2013, retrieved Jun. 25, 2025. (Year: 2013).*

Diana Marculescu, etc., "Hardware-Aware Machine Learning: Modeling and Optimization", published to arXiv on Sep. 14, 2018, retrieved Jun. 25, 2025. (Year: 2018).*

Tianqi Chen, etc., "TVM: An Automated End-to-End Optimizing Compiler for Deep Learning", published to arXiv on Oct. 5, 2018, retrieved Jun. 25, 2025. (Year: 2018).*

Design & Reuse, "HW/SW Interface Generation Flow Based on Abstract Models of System Applications and Hardware Architectures", published on Oct. 11, 2010, retrieved Jun. 25, 2025. (Year: 2010).*

Office Action for Chinese Patent Application No. 202010601781.5, dated Jun. 8, 2023, 21 pages.

PCT/ISA/210 and PCT/ISA/237 for PCT/CN2020/115660, dated Apr. 1, 2021.

European Extended Search Report of European Application No. 20930649.7 dated Jan. 27, 2023, 12 pages.

Office Action of Japanese Application No. 2021-562306 dated Dec. 5, 2022, 7 pages.

Hannes Fassold (Joanneum) et al: "Neural Network Exchange Formats and Acceleration Libraries", 124. MPEG Meeting; Oct. 8, 2018-Oct. 12, 2018; Macao; (Motion Picture Expert Group or ISO/IEC JTC1/SC29/WG11), No. m44592, Oct. 2, 2018 (Oct. 2, 2018), 9 pages.

Engl Translation & Office Action dated Nov. 19, 2024(KR 10-2021-7033450), 13 pgs.

* cited by examiner

METHOD AND APPARATUS FOR ADAPTING DEEP LEARNING MODEL, AND ELECTRONIC DEVICE

CROSS REFERENCE TO RELATED APPLICATIONS

This application is a US national phase application of International Application No. PCT/CN2020/115660, filed on Sep. 16, 2020, which is based on and claims priority to Chinese Patent Application No. 202010601781.5, filed on Jun. 29, 2020, the entire contents of which are incorporated herein for all purposes.

TECHNICAL FIELD

The present disclosure relates to a field of computer technology, specifically to technical fields of artificial intelligence, deep learning, and cloud computing, and particularly to a method and an apparatus for adapting a deep learning model, an electronic device and a storage medium.

BACKGROUND

At present, deep learning represented by neural networks is widely implemented and applied in the industry. Based on the deployment need of large-scale deep learning models, various types of artificial intelligence (AI) inference accelerator chips have emerged. However, various types of AI inference accelerator chips have different forms, different hashrates, and various application scenarios. Therefore, one AI inference accelerator chip is often only suitable for the deep learning model under a certain framework, and cannot run deep learning models under other frameworks.

Therefore, how to adapt deep learning models under various frameworks to AI inference accelerator chips is a technical problem that needs to be solved urgently.

SUMMARY

According to a first aspect of embodiments of the present disclosure, a method for adapting a deep learning model is provided. The method includes: obtaining model information of an original deep learning model and hardware information of a target hardware to be adapted; querying a conversion path table according to the model information and the hardware information to obtain a matched target conversion path; and converting, according to the target conversion path, the original deep learning model to an intermediate deep learning model in the conversion path, and converting the intermediate deep learning model to the target deep learning model.

According to a second aspect of embodiments of the present disclosure, an electronic device is provided, including: at least one processor; and a memory communicatively coupled to at least one processor; wherein the memory is configured to store instructions executable by at least one processor. When the instructions are executed by at least one processor, at least one processor is enabled to implement the method for adapting a deep learning model in the first aspect of embodiments of the present disclosure.

According to a third aspect of embodiments of the present disclosure, a non-transitory computer-readable storage medium having computer instructions stored thereon is provided, wherein the computer instructions are configured to implement the method for adapting a deep learning model in the first aspect of embodiments.

It is to be understood that the content in this part is not intended to identify key or important features of embodiments of the present disclosure, and does not limit the scope of the present disclosure. Other features of the present disclosure will be easily understood through the following specification.

BRIEF DESCRIPTION OF THE DRAWINGS

The drawings are used to better understand the solution, and are not restrictive of the disclosure.

DETAILED DESCRIPTION

The following describes exemplary embodiments of the present disclosure with reference to the attached drawings, which include various details of the embodiments of the present disclosure to facilitate understanding, and they should be considered as merely exemplary. Therefore, those skilled in the art should realize that various changes and modifications can be made to the embodiments described herein without departing from the scope and spirit of the present disclosure. Similarly, for clarity and conciseness, descriptions of well-known functions and structures are omitted in the following description.

The following illustrate a method and an apparatus for adapting a deep learning model, an electronic device and a storage medium in embodiments of the present disclosure with reference to drawings.

Figure 1:
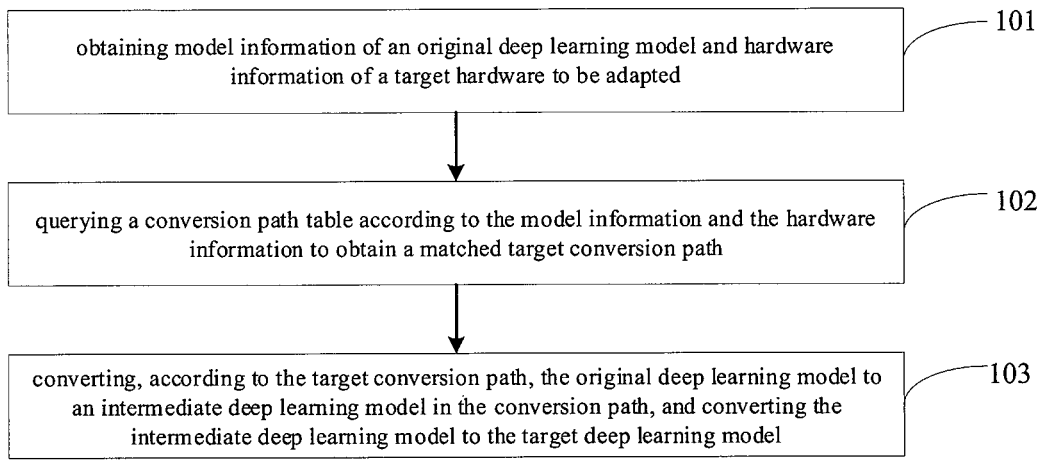
FIG. 1 is a flowchart illustrating a method for adapting a deep learning model provided by a first embodiment of the present disclosure.

FIG. 1 is a flow chart illustrating a method for adapting a deep learning model provided by a first embodiment of the present disclosure.

In this embodiment, as an example, the method for adapting a deep learning model is configured to an apparatus for adapting a deep learning model. The apparatus for adapting a deep learning model may be applied to any electronic device, so that the electronic device can perform the function for adapting the deep learning model.

The electronic device may be a personal computer (PC), a cloud device, or a mobile device, in which the mobile device may be, for example, a mobile phone, a tablet computer, a personal digital assistant, a wearable device, an on-board device, and other hardware devices with various operating systems.

As illustrated in FIG. 1, the method for adapting the deep learning model may include the following step.

At step 101, model information of an original deep learning model and hardware information of a target hardware to be adapted are obtained.

The original deep learning model refers to the machine learning model to be converted that includes the deep neural network structure. The model information of the deep learning model may include the training framework of the deep learning model, the network type of the deep learning model, the model structure information of the deep learning model, the model file of the deep learning model, and the like.

For example, the training framework of the deep learning model may be the framework of the open source software library (such as TensorFlow framework), PyTorch framework, deep learning framework (such as Convolutional Architecture for Fast Feature Embedding, Caffe for short), parallel distributed deep learning framework (PaddlePaddle) and the like.

The network type of the deep learning model may include all mainstream classification, detection and segmentation neural networks. For example, the network type may be a deep convolutional neural network (such as AlexNet), a model based on deep decomposable convolution (such as MobileNet), a network model for target detection (such as Regions with CNN features, RCNN for short), and the like.

The model structure information of the deep learning model may be the basic structure included in the deep learning model, for example, may include a fully connected layer, a loop structure, a convolutional layer/pooling layer, and the like.

The model file of the deep learning model may be a file obtained by constructing a model by algorithm engineers using a certain deep learning framework, and saving finally generated network parameters and model structure together after parameter adjustment and training optimization. The formats of model files trained by different deep learning frameworks are not the same, but the complete model file generally includes information such as tensor data, arithmetic units, and calculation graphs.

It could be understood that the artificial intelligence hardware can only run the deep learning model that meets its own requirements. Therefore, when the hardware information of the target hardware that needs to be adapted is different, the corresponding deep learning model that can be run is different.

Optionally, the hardware information of the target hardware to be adapted may be the type of the target hardware to be adapted, for example, the Intel central processing unit/processor (Intel CPU for short), the ARM processor, the HiSilicon processor and the like.

It should be noted that the target hardware to be adapted may be any mainstream artificial intelligence hardware currently on the market, which is not limited here.

In a possible situation, the target hardware to be adapted is not limited to one, but there may also be two or more target hardware to be adapted. In this case, the hardware information of the target hardware to be adapted includes hardware information of all the target hardware.

At step 102, a conversion path table is queried according to the model information and the hardware information to obtain a matched target conversion path.

The conversion path table may refer to conversion paths preconfigured according to model training frameworks, network types, model files, and the like of any two deep learning models, and hardware information of the target hardware to be adapted. The conversion path table may include training frameworks, network types, model files of any type of deep learning model, and conversion paths of target hardware to be adapted.

The target conversion path refers to the conversion path that matches the model information of the original deep learning model and the hardware information of the target hardware to be adapted in the conversion path table.

In embodiments of the present disclosure, after obtaining the model information of the original deep learning model and the hardware information of the target hardware to be adapted, the matched target conversion path may be queried from the conversion path table according to the model information and hardware information.

As an example, assuming that the original deep learning model (MobileNetV1 model) trained by the PaddlePaddle training framework needs to be converted to the deep learning model executed on the Intel CPU, according to the model information of the MobileNetV1 model and the target hardware to be adapted, the conversion path table is queried, and the matched target conversion path may be obtained: Paddle model→caffe model→optimize model→dldt model (applicable to Intel CPU).

At step 103, according to the target conversion path, the original deep learning model is converted to an intermediate deep learning model in the conversion path, and the intermediate deep learning model is converted to the target deep learning model.

It could be understood that the conversion process of converting the original deep learning model to the target deep learning model may require a plurality of model conversions to obtain a deep learning model that can be executed by the adapted target hardware.

In the present disclosure, after determining the target conversion path of converting the original deep learning model to the target deep learning model, the original deep learning model may be converted to the intermediate deep learning model in the conversion path according to the target conversion path, and then the intermediate deep learning model may be converted to the target deep learning model.

In a possible situation, when the original deep learning model is converted to the target deep learning model according to the target conversion path, there is only one intermediate deep learning model in the conversion process. First, the original deep learning model may be converted to the intermediate deep learning model according to the target conversion path, and then the intermediate deep learning model is converted to the target deep learning model.

In another possible situation, when the original deep learning model is converted to the target deep learning model according to the target conversion path, there may be a plurality of intermediate deep learning models in the conversion process.

As an example, assuming that the target conversion path is: Paddle model→caffe model→optimize model→dldt model (applicable to Intel CPU), then, according to the target conversion path, the original deep learning model, Paddle model, may be converted to the intermediate deep learning model, caffe model, according to the target conversion path, and then the intermediate deep learning model, caffe model, may be converted to the intermediate deep learning model, optimize model, and the intermediate deep learning model, optimize model, is converted to the target deep learning model, dldt model, adapted to the Intel CPU.

With the method for adapting the deep learning model according to embodiments of the present disclosure, after the model information of the original deep learning model and hardware information of the target hardware to be adapted are obtained, the conversion path table is queried according to the model information and the hardware information to obtain the matched target conversion path, and further, according to the target conversion path, the original deep learning model is converted to the intermediate deep learning model in the conversion path, and the intermediate deep learning model is converted to the target deep learning model. Therefore, the model conversion path is determined based on the model information of the original deep learning model and the hardware information of the target hardware, and the deep learning model conversion is performed according to the model conversion path, which realizes converting any type of original deep learning model into the target deep learning model adapted to any target hardware, and solves the problem that the deep learning model is difficult to be applied to different hardware terminals.

On the basis of the above embodiments, in a possible situation, when the original deep learning model is converted to the target deep learning model according to the target conversion path in the above step 103, there may be a plurality of intermediate deep learning models in the conversion process. At this time, the target conversion path may be configured to indicate the conversion sequence of the plurality of intermediate deep learning models. When performing model conversions according to the target conversion path, the conversion tasks of respective model conversions may be performed according to the conversion sequence of the plurality of intermediate deep learning models, to realize converting the original deep learning model to the target deep learning model adapted to the target hardware, thereby achieving any type of model conversion. The detailed description will be given below with reference to FIG. 2, which is a sub-flowchart illustrating a model conversion provided by a second embodiment of the present disclosure.

Figure 2:
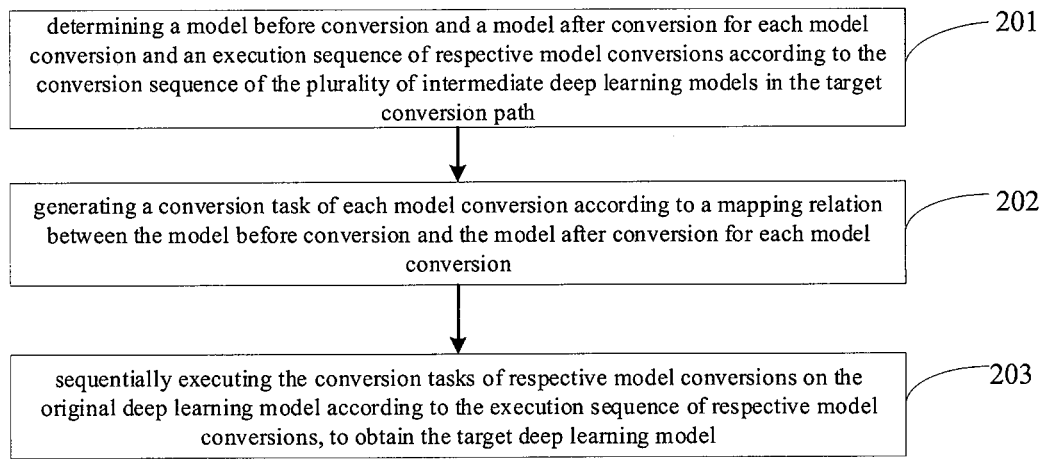
FIG. 2 is a sub-flowchart illustrating a model conversion provided by a second embodiment of the present disclosure.

As illustrated in FIG. 2, the step 103 may include the following steps.

At step 201, a model before conversion and a model after conversion for each model conversion and an execution sequence of respective model conversions are determined according to the conversion sequence of the plurality of intermediate deep learning models in the target conversion path.

It should be noted that when there are a plurality of intermediate deep learning models in the conversion process of converting the original deep learning model to the target deep learning model according to the target conversion path, the target conversion path includes the conversion sequence of the plurality of intermediate deep learning models.

In embodiments of the present disclosure, when there are a plurality of intermediate deep learning models in the conversion process of converting the original deep learning model to the target deep learning model according to the target conversion path, the model before conversion and the model after conversion for each model conversion and the execution sequence of respective model conversions may be determined according to the conversion sequence of the plurality of intermediate deep learning models in the target conversion path.

As an example, assuming that the target conversion path is: Paddle model→caffe model→optimize model→dldt model, it can be seen that there are two intermediate deep learning models. In the process that the original deep learning model is converted to the target deep learning model according to the target conversion path, first, according to the conversion sequence of the plurality of intermediate deep learning models in the target conversion path, it is determined that the model before conversion for the first model conversion is the Paddle model and the model after conversion for the first model conversion is the caffe model, and the model before conversion for the second model conversion is the caffe model and the model after conversion for the second model conversion is the optimize model, and further, the model before conversion for the third model conversion is the optimize model and the model after conversion for the third model conversion is the dldt model. Thus, the model before conversion and the model after conversion for each model conversion and the execution sequence of respective model conversions may be determined according to the conversion sequence of the plurality of intermediate deep learning models in the target conversion path.

At step 202, a conversion task of each model conversion is generated according to a mapping relation between the model before conversion and the model after conversion for each model conversion.

In embodiments of the present disclosure, after the model before conversion and the model after conversion for each model conversion are determined, the mapping relation between the model before conversion and the model after conversion for each model conversion may be determined, and further, the conversion task of each model conversion may be generated according to the mapping relation between the model before conversion and the model after conversion for each model conversion.

The example in step 201 is also taken as the example, assuming that the target conversion path is: Paddle model→caffe model→optimize model→dldt model, conversion tasks for three model conversions may be generated, which are conversion task one, Paddle model→caffe model; conversion task two, caffe model→optimize model; and conversion task three, optimize model→dldt model, respectively.

As a possible implementation, at least one of an operator mapping relation, a tensor mapping relation, and a model parameter mapping relation may be queried for the model before conversion and the model after conversion of each model conversion, so that the conversion task for each model conversion may be generated according to at least one of the operator mapping relation, the tensor mapping relation, and the model parameter mapping relation. Therefore, the target deep learning model may be obtained by performing the conversion tasks of respective model conversions.

The model operators of the model before conversion and the model after conversion for each model conversion may be different, or the alignments of the model operators may be different. Therefore, the operator mapping relations may be queried to determine the operator mapping relation between the model before conversion and the model after conversion.

The tensor is the core component of all deep learning frameworks, which is actually a multi-dimensional array whose purpose is to create higher-dimensional matrices and vectors. The model parameters may include parameters of respective convolutional layers, such as the number of parameters, the space occupied by the parameters, and the like.

At step 203, the conversion tasks of respective model conversions are sequentially executed on the original deep learning model according to the execution sequence of respective model conversions, to obtain the target deep learning model.

In embodiments of the present disclosure, after the execution sequence of respective model conversions is determined according to the conversion sequence of the plurality of intermediate deep learning models in the target conversion path, the conversion tasks of respective model conversions may be sequentially executed on the original deep learning model according to the execution sequence of respective model conversions, to obtain the target deep learning model adapted to the target hardware.

Continuing with the above example, the conversion tasks of respective model conversions that need to be executed sequentially for converting the original deep learning model to the target deep learning model according to the target conversion path are: conversion task one, Paddle model→caffe model; conversion task two, caffe model→optimize model; and conversion task three, optimize model→dldt model. Furthermore, the conversion tasks of the three model conversions are sequentially executed, thereby obtaining the target deep learning model adapted to the Intel CPU.

In embodiments of the present disclosure, in the process of converting, according to the target conversion path, the original deep learning model to the intermediate deep learning model in the conversion path, and converting the intermediate deep learning model to the target deep learning model, when there are a plurality of intermediate deep learning models, the execution sequence of respective model conversions may be determined according to the conversion sequence of the plurality of intermediate deep learning model in the target conversion path, and further the conversion tasks of respective model conversions may be sequentially executed on the original deep learning model according to the execution sequence of respective model conversions, to obtain the target deep learning model adapted to the target hardware. Compared with the existing deep learning model conversion that can only achieve one model conversion task, the present disclosure realizes that there are a plurality of model conversion tasks during the model conversion process, so that any model conversion is achieved, and the purpose that the deep learning model can be adapted to any hardware is achieved.

In actual application scenarios, there may be cases where the original deep learning model is converted to adapt to a plurality of target hardware, that is, there are at least two target hardware. In this case, the target conversion path generated in step 102 above also includes at least two paths, so that the original deep learning model may be converted to at least two target deep learning models adapted to at least two target hardware according to at least two target conversion paths. The detailed description will be given below with reference to FIG. 3, which is a sub-flowchart illustrating generating a target conversion path provided by a third embodiment of the present disclosure.

Figure 3:
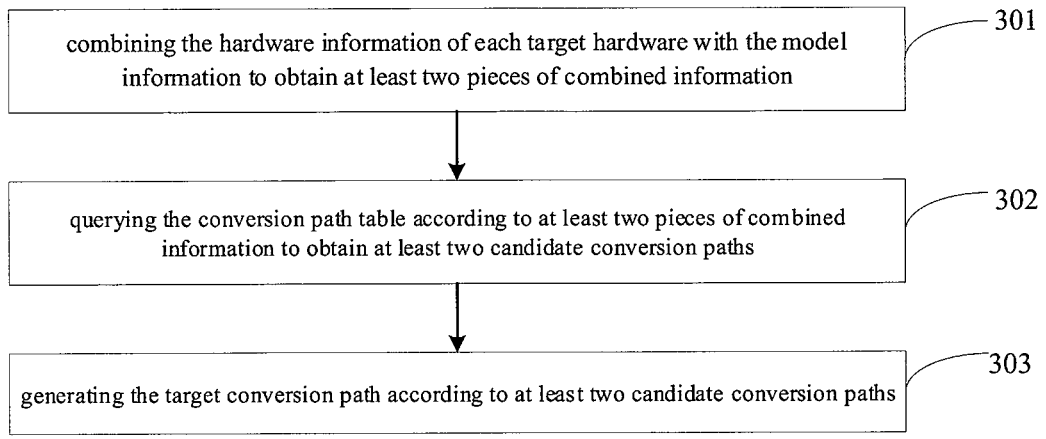
FIG. 3 is a sub-flowchart illustrating generating a target conversion path provided by a third embodiment of the present disclosure.

As illustrated in FIG. 3, step 102 may include the following sub-steps.

At step 301, the hardware information of each target hardware is combined with the model information, to obtain at least two pieces of combined information.

In a possible situation, the original deep learning model needs to adapt to at least two target hardware. After obtaining the hardware information of each target hardware, the hardware information of each target hardware may be combined with the model information of the original deep learning model. Therefore, at least two pieces of combined information are obtained.

The model information of the original deep learning model may include model structure information and training framework information. Thus, the model structure information and training framework information of the original deep learning model may be combined with the hardware information of each target hardware respectively, to obtain at least two pieces of combined information.

As an example, assuming that there are two target hardware, namely hardware A and hardware B, then the model information of the original deep learning model may be combined with the hardware information of hardware A and with the hardware information of hardware B, so that two pieces of combined information may be obtained.

At step 302, the conversion path table is queried according to at least two pieces of compound information to obtain at least two candidate conversion paths.

Each candidate conversion path matches one corresponding piece of combined information.

It could be understood that the hardware information of at least two target hardware is not the same. Thus, after obtaining at least two pieces of combined information, at least two candidate conversion paths may be obtained by querying the conversion path table according to the at least two pieces of combined information, in which each candidate conversion path matches one piece of corresponding combined information.

As an example, assuming that the original deep learning model may be a Paddle model, and the MobileNetV1 model trained by PaddlePaddle needs to be converted to a deep learning model executed on the Intel CPU and HiSilicon 910 chip, then after determining the combined information corresponding to two target hardware, two candidate conversion paths obtained by querying the conversion path table according to the two combined information may be as follows:

Path 1, Paddle model→caffe model→optimize model→dldt model (adapted to Intel CPU);
Path 2, Paddle model→caffe model→optimize model→atlas model (adapted to HiSilicon 910).

At step 303, the target conversion path is generated according to the at least two candidate conversion paths.

In embodiments of the present application, when the original deep learning model needs to be adapted to at least two target hardware, after determining at least two candidate conversion paths, the target conversion path may be generated based on at least two candidate conversion paths.

In a possible situation, assuming that there are no overlapping conversion tasks in the at least two candidate conversion paths, the at least two candidate conversion paths may be used as target conversion paths, and the original deep learning model may be converted respectively to obtain target deep learning models adapted to the at least two target hardware.

In another possible situation, assuming that there are overlapping parts in the at least two candidate conversion paths, the target conversion path may be obtained by merging the overlapping parts of the at least two candidate conversion paths.

For example, in the example in step 302, the overlapping parts in the two candidate conversion paths are: Paddle model→caffe model→optimize model, then the overlapping parts in the two candidate conversion paths may be merged to obtain the merged target conversion path as follows:

$$\text{Paddle model} \to \text{caffe model} \to \text{optimized model} \to \begin{bmatrix} dltl\ modle \\ atlas\ model \end{bmatrix}$$

Therefore, when there are overlapping parts in at least two candidate conversion paths, the overlapping parts of at least two candidate conversion paths may be merged to realize the optimization of at least two candidate conversion paths, so that target deep learning models adapted to at least two target hardware may be quickly generated according to the optimized target conversion path.

It can be seen that when there are at least two target hardware, the hardware information of each target hardware may be combined with the model information to obtain at least two pieces of combined information, at least two candidate conversion paths are obtained by querying the conversion path table according to the at least two pieces of combined information, and further the target conversion path is generated based on the at least two candidate conversion paths. Therefore, when the original deep learning model needs to be adapted to a plurality of target hardware, the target deep learning models adapted to at least two target hardware may be quickly generated according to the target conversion path, thereby increasing the rate of model conversion.

To realize the above embodiments, the present disclosure provides an apparatus for adapting a deep learning model.

Figure 4:
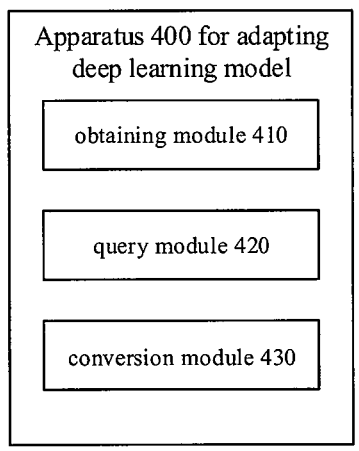
FIG. 4 is a block diagram illustrating an apparatus for adapting a deep learning model provided by a fourth embodiment of the present disclosure.

FIG. 4 is a block diagram illustrating an apparatus for adapting a deep learning model provided by a fourth embodiment of the present disclosure.

As illustrated in FIG. 4, the apparatus 400 for adapting a deep learning model may include an obtaining module 410, a query module 420, and a conversion module 430.

The obtaining module 410 is configured to obtain model information of an original deep learning model and hardware information of a target hardware to be adapted.

The query module 420 is configured to query a path conversion table according to the model information and the hardware information to obtain a matched target conversion path.

The conversion module 430 is configured to convert, according to the target conversion path, the original deep learning model to an intermediate deep learning model in the conversion path, and convert the intermediate deep learning model to the target deep learning model.

As a possible situation, there are a plurality of intermediate deep learning models, and the target conversion path is configured to indicate a conversion sequence of the plurality of intermediate deep learning models. The conversion module 430 may include a determining unit, a generating unit, and an execution unit.

The determining unit is configured to determine a model before conversion and a model after conversion for each model conversion and an execution sequence of respective model conversions according to the conversion sequence of the plurality of intermediate deep learning models in the target conversion path.

The generating unit is configured to generate a conversion task of each model conversion according to a mapping relation between the mode before conversion and the model after conversion of each model conversion.

The execution unit is configured to sequentially execute the conversion tasks of respective model conversions on the original deep learning model according to the execution sequence of respective model conversions, to obtain the target deep learning model.

As another possible situation, the generating unit may be further configured to: query at least one of an operator mapping relation, a tensor mapping relation, and a model parameter mapping relation for the model before conversion and the model after conversion of each model conversion; and generate the conversion task for each model conversion according to at least one of the operator mapping relation, the tensor mapping relation, and the model parameter mapping relation.

As another possible situation, there are at least two target hardware, and the query module 420 may include a combining unit, a query unit, and a path generating unit.

The combining unit is configured to combine the hardware information of each target hardware with the model information to obtain at least two pieces of combined information.

The query unit is configured to query the conversion path table according to at least two pieces of compound information to obtain at least two candidate conversion paths, in which each candidate conversion path matches one corresponding piece of combined information.

The path generating unit is configured to generate the target conversion path according to the at least two candidate conversion paths.

As another possible situation, the path generating unit may be further configured to: determine overlapping parts of the at least two candidate conversion paths; and merge the overlapping parts of at least two candidate conversion paths to obtain the target conversion path.

As another possible situation, the model information may include model structure information and training framework information.

It is to be noted that the explanation of the method for adapting the deep learning model in the above embodiments is also applicable to the apparatus for adapting the deep learning model of this embodiment, which will not be elaborated here.

With the apparatus for adapting the deep learning model according to embodiments of the present disclosure, after obtaining the model information of the original deep learning model and hardware information of the target hardware to be adapted, the matched target conversion path is obtained by querying the conversion path table according to the model information and the hardware information, and further, according to the target conversion path, the original deep learning model is converted to the intermediate deep learning model in the conversion path, and the intermediate deep learning model is converted to the target deep learning model. Therefore, the model conversion path is determined based on the model information of the original deep learning model and the hardware information of the target hardware, and the deep learning model conversion is performed according to the model conversion path, which realizes converting any type of original deep learning model to the target deep learning model adapted to any target hardware, and solves the problem that the deep learning model is difficult to be applied to different hardware terminals.

To realize the above embodiments, the present disclosure provides an electronic device, including: at least a processor; and a memory communicatively coupled to at least one processor; in which the memory is configured to store instructions executable by at least one processor. When the instructions are executed by at least one processor, at least one processor is enabled to implement the method for adapting the deep learning model in the above embodiments.

In order to realize the above embodiments, the present disclosure provides a non-transitory computer-readable storage medium having computer instructions stored thereon, in which the computer instructions are configured to cause the computer to implement the method for adapting the deep learning model in the above embodiments.

According to embodiments of the present disclosure, the present disclosure further provides an electronic device and a readable storage medium.

Figure 5:
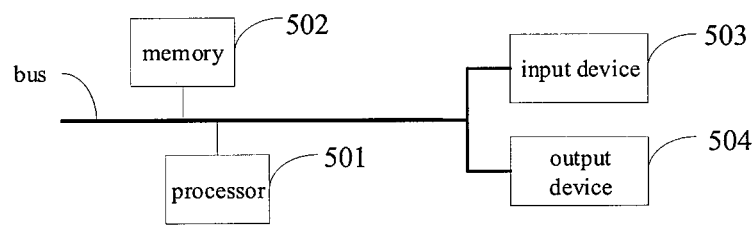
FIG. 5 is a block diagram illustrating an electronic device for implementing embodiments of the present disclosure.

FIG. 5 is a block diagram illustrating an electronic device of a method for adapting a deep learning model according to an exemplary embodiment. The electronic device is intended to represent various forms of digital computers, such as laptop computers, desktop computers, work tables, personal digital assistants, servers, blade servers, mainframe computers, and other suitable computers. The electronic device may also represent various forms of mobile devices, such as personal digital processors, cellular phones, smart phones, wearable devices, and other similar computing devices. The components illustrated herein, their connections and relationships, and their functions are merely examples, and are not intended to limit the implementation of the disclosure described and/or claimed herein.

As illustrated in FIG. 5, the electronic device includes one or more processors 501, a memory 502, and interfaces for connecting various components, including high-speed interfaces and low-speed interfaces. The various components are connected to each other via different buses, and may be installed on a common motherboard or installed in other ways as needed. The processor may process instructions executed in the electronic device, including instructions stored in or on the memory to display graphical information of the GUI on an external input/output device (such as a display device coupled to an interface). In other embodiments, when necessary, a plurality of processors and/or a plurality of buses may be used together with a plurality of memories. Similarly, a plurality of electronic devices may be connected, and each device provides some necessary operations (for example, as a server array, a group of blade servers, or a multi-processor system). In FIG. 5, as an example, there is one processor 501.

The memory 502 is the non-transitory computer-readable storage medium provided by the disclosure. The memory stores instructions that can be executed by at least one processor, so that at least one processor implements the method for adapting the deep learning model provided by the present disclosure. The non-transitory computer-readable storage medium of the present disclosure has computer instructions stored thereon, in which the computer instructions are configured to cause a computer to implement the method for adapting the deep learning model provided by the present disclosure.

As a non-transitory computer-readable storage medium, the memory 502 may be configured to store non-transitory software programs, non-transitory computer-executable programs and modules, such as program instructions/modules corresponding to the method for adapting the deep learning model in the embodiments of the present disclosure (for example, the obtaining module 410, the query module 501, and the conversion module 430 illustrated in FIG. 4). The processor 501 implements various functional applications and data processing of the server, that is, implements the method for adapting the deep learning model in the above method embodiments, by running non-transitory software programs, instructions, and modules stored in the memory 502.

The memory 502 may include a program storage area and a data storage area, in which the program storage area may store an operating system and at least one application required by one function, and the data storage area may store data created by the use of the electronic device. In addition, the memory 502 may include a high-speed random access memory, and may also include a non-transitory memory, such as at least one magnetic disk storage device, flash memory device, or other non-transitory solid-state storage devices. In some embodiments, the memory 502 may optionally include a memory remotely provided compared with the processor 501, and these remote memories may be connected to the electronic device via network connection. Examples of the above network include, but are not limited to, Internet, corporate Intranet, local area network, mobile communication network, and combinations thereof.

The electronic device may further include: an input device 503 and an output device 504. The processor 501, the memory 502, the input device 503, and the output device 504 may be connected via a bus or other methods. In FIG. 5, the connection via a bus is taken as an example.

The input device 503 can receive inputted digital or character information, and generate key signal input related to the user settings and function control of the electronic device. The input device 503 may be, for example, touch screens, keypads, mouses, trackpads, touchpads, instructing arms, one or more mouse buttons, trackballs, and joysticks. The output device 504 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described herein can be executed in digital electronic circuit systems, integrated circuit systems, specific application-specific integrated circuit (ASIC), computer hardware, firmware, software, and/or combinations thereof. These various embodiments may be executed in one or more computer programs, in which the one or more computer programs may be executed and/or interpreted on a programmable system including at least one programmable processor, in which the programmable processor may be a dedicated or general purpose programmable processor that can receive data and instructions from the storage system, at least one input device, and at least one output device, and transmit the data and instructions to the storage system, at least one input device, and at least one output device.

These computational procedures (also called programs, software, software applications, or codes) include machine instructions of a programmable processor, and may be executed using high-level procedures and/or object-oriented programming languages, and/or assembly/machine language. As used herein, the terms "machine-readable medium" and "computer-readable medium" refer to any computer program product, device, and/or apparatus used to provide machine instructions and/or data to a programmable processor (for example, magnetic disks, optical disks, memories, programmable logic devices (PLD)), including machine-readable media that receive machine instructions as machine-readable signals. The term "machine-readable signal" refers to any signal used to provide machine instructions and/or data to a programmable processor.

In order to provide interaction with the user, the systems and technologies described herein may be executed on a computer and the computer includes a display apparatus for displaying information to the user (for example, a CRT (cathode ray tube) or an LCD (liquid crystal display) monitor)); and a keyboard and a pointing apparatus (for example, a mouse or a trackball) through which the user can provide input to the computer. Other types of apparatus may also be used to provide interaction with the user; for example, the feedback provided to the user may be any form of sensory feedback (for example, visual feedback, auditory feedback, or tactile feedback); and the input from the user may be received in any form (including acoustic input, voice input, or tactile input).

The systems and technologies described herein may be executed in a computing system that includes back-end components (for example, as a data server), or a computing system that includes middleware components (for example, an application server), or a computing system that includes front-end components (for example, a user computer with a graphical user interface or web browser through which the user can interact with the implementation of the systems and technologies described herein), or a computing system that includes any combination of the back-end components, middleware components, or front-end components. The components of the system may be connected to each other through any form or medium of digital data communication (for example, a communication network). Examples of the communication network include: local area networks (LAN), wide area networks (WAN), and the Internet.

The computer system may include a client and a server. The client and server are generally far away from each other and usually interact through a communication network. The relationship between the client and the server is generated by computer programs that run on the corresponding computer and have a client-server relationship with each other.

According to the technical solution of embodiments of the present disclosure, after obtaining model information of the original deep learning model and hardware information of the target hardware to be adapted, the matched target conversion path is obtained by querying the conversion path table according to the model information and the hardware information, and further, according to the target conversion path, the original deep learning model is converted to an intermediate deep learning model in the conversion path, and the intermediate deep learning model is converted to the target deep learning model. Therefore, based on the model information of the original deep learning model and the hardware information of the target hardware, the model conversion path is determined, and the deep learning model conversion is performed according to the model conversion path, which realizes converting any type of original deep learning model to the target deep learning model adapted to any target hardware, and solves the problem that the deep learning model is difficult to be applied to different hardware terminals.

It could be understood that various forms of processes illustrated above may be used in a new order, with added steps or with deleted steps. For example, steps described in the present disclosure may be executed in parallel, sequentially, or in a different order, as long as the desired result of the technical solution disclosed in the present disclosure can be achieved, which is not limited herein.

The above specific implementations do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of this disclosure.

What is claimed is:

1. A method for adapting a deep learning model, comprising:
obtaining model structure information of an original deep learning model and hardware information of a target hardware to be adapted;
querying a conversion path table according to the model structure information and the hardware information to obtain a matched target conversion path; and
converting, according to the target conversion path, the original deep learning model to an intermediate deep learning model in the conversion path, and converting the intermediate deep learning model to a target deep learning model;
wherein there are a plurality of intermediate deep learning models, and the target conversion path is configured to indicate a conversion sequence of the plurality of intermediate deep learning models;
wherein converting, according to the target conversion path, the original deep learning model to the intermediate deep learning model in the conversion path, and converting the intermediate deep learning model to the target deep learning model comprises:
determining a model before conversion and a model after conversion for each model conversion and an execution sequence of respective model conversions according to the conversion sequence of the plurality of intermediate deep learning models in the target conversion path;
generating a conversion task of each model conversion according to a mapping relation between the model before conversion and the model after conversion of each model conversion; and
sequentially executing the conversion tasks of respective model conversions on the original deep learning model according to the execution sequence of respective model conversions, to obtain the target deep learning model;
wherein the model structure information of the deep learning model comprises a fully-connected layer, a loop structure, a convolutional layer and a pooling layer;
wherein the hardware information is an artificial intelligence, AI, inference accelerator chip information.

2. The method of claim 1, wherein generating the conversion task of each model conversion according to the mapping relation between the model before conversion and the model after conversion of each model conversion comprises:
querying at least one of an operator mapping relation, a tensor mapping relation, and a model parameter mapping relation for the model before conversion and the model after conversion of each model conversion; and
generating the conversion task for each model conversion according to at least one of the operator mapping relation, the tensor mapping relation, and the model parameter mapping relation.

3. The method of claim 1, wherein there are at least two target hardware, and querying the conversion path table according to the model structure information and the hardware information to obtain the matched target conversion path comprises:
combining the hardware information of each target hardware with the model structure information to obtain at least two pieces of combined information;
querying the conversion path table according to at least two pieces of combined information to obtain at least two candidate conversion paths, wherein each candidate conversion path matches one piece of combined information; and
generating the target conversion path according to the at least two candidate conversion paths.

4. The method of claim 3, wherein generating the target conversion path according to the at least two candidate conversion paths comprises:
determining overlapping parts of the at least two candidate conversion paths; and
merging the overlapping parts of the at least two candidate conversion paths to obtain the target conversion path.

5. The method of claim 1, wherein the model structure information comprises model structure information and training framework information.

6. An electronic device, comprising:
at least one processor; and
a memory communicatively coupled to the at least one processor;
wherein the memory is configured to store instructions executable by the at least one processor;
when the instructions are executed by the at least one processor, the at least one processor is configured to:
obtain model structure information of an original deep learning model and hardware information of a target hardware to be adapted;
query a conversion path table according to the model structure information and the hardware information to obtain a matched target conversion path; and
convert, according to the target conversion path, the original deep learning model to an intermediate deep learning model in the conversion path, and convert the intermediate deep learning model to a target deep learning model;
wherein there are a plurality of intermediate deep learning models, and the target conversion path is configured to indicate a conversion sequence of the plurality of intermediate deep learning models;
wherein the at least one processor is configured to:
determine a model before conversion and a model after conversion for each model conversion and an execution sequence of respective model conversions according to the conversion sequence of the plurality of intermediate deep learning models in the target conversion path;
generate a conversion task of each model conversion according to a mapping relation between the model before conversion and the model after conversion of each model conversion; and
sequentially execute the conversion tasks of respective model conversions on the original deep learning model according to the execution sequence of respective model conversions, to obtain the target deep learning model;
wherein the model structure information of the deep learning model comprises a fully-connected layer, a loop structure, a convolutional layer and a pooling layer;
wherein the hardware information is an artificial intelligence, AI, inference accelerator chip information.

7. The electronic device of claim 6, wherein the at least one processor is configured to:
query at least one of an operator mapping relation, a tensor mapping relation, and a model parameter mapping relation for the model before conversion and the model after conversion of each model conversion; and
generate the conversion task for each model conversion according to at least one of the operator mapping relation, the tensor mapping relation, and the model parameter mapping relation.

8. The electronic device of claim 6, wherein there are at least two target hardware, and the at least one processor is configured to:
combine the hardware information of each target hardware with the model structure information to obtain at least two pieces of combined information;
query the conversion path table according to at least two pieces of combined information to obtain at least two candidate conversion paths, wherein each candidate conversion path matches one piece of combined information; and
generate the target conversion path according to the at least two candidate conversion paths.

9. The electronic device of claim 8, wherein the at least one processor is configured to:
determine overlapping parts of the at least two candidate conversion paths; and
merge the overlapping parts of the at least two candidate conversion paths to obtain the target conversion path.

10. The electronic device of claim 6, wherein the model structure information comprises model structure information and training framework information.

11. A non-transitory computer-readable storage medium having computer instructions stored thereon, wherein the computer instructions are configured to enable a computer to implement a method for adapting a deep learning model, the method comprising:
obtaining model structure information of an original deep learning model and hardware information of a target hardware to be adapted;
querying a conversion path table according to the model information and the hardware information to obtain a matched target conversion path; and
converting, according to the target conversion path, the original deep learning model to an intermediate deep learning model in the conversion path, and converting the intermediate deep learning model to a target deep learning model;
wherein there are a plurality of intermediate deep learning models, and the target conversion path is configured to indicate a conversion sequence of the plurality of intermediate deep learning models;
wherein converting, according to the target conversion path, the original deep learning model to the intermediate deep learning model in the conversion path, and converting the intermediate deep learning model to the target deep learning model comprises:
determining a model before conversion and a model after conversion for each model conversion and an execution sequence of respective model conversions according to the conversion sequence of the plurality of intermediate deep learning models in the target conversion path;
generating a conversion task of each model conversion according to a mapping relation between the model before conversion and the model after conversion of each model conversion; and
sequentially executing the conversion tasks of respective model conversions on the original deep learning model according to the execution sequence of respective model conversions, to obtain the target deep learning model;
wherein the model structure information of the deep learning model comprises a fully-connected layer, a loop structure, a convolutional layer and a pooling layer;
wherein the hardware information is an artificial intelligence, AI, inference accelerator chip information.

* * * * *